(12) United States Patent
Jones et al.

(10) Patent No.: US 11,069,125 B2
(45) Date of Patent: Jul. 20, 2021

(54) GEOMETRY BUFFER SLICE TOOL

(71) Applicant: Intuitive Research and Technology Corporation, Huntsville, AL (US)

(72) Inventors: Michael Jones, Harvest, AL (US); Kyle Russell, Huntsville, AL (US); Chanler Crowe Cantor, Madison, AL (US); Michael Yohe, Meridianville, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 0 days.

(21) Appl. No.: 16/844,453

(22) Filed: Apr. 9, 2020

(65) Prior Publication Data
US 2020/0327722 A1    Oct. 15, 2020

Related U.S. Application Data

(60) Provisional application No. 62/831,309, filed on Apr. 9, 2019.

(51) Int. Cl.
| | |
|---|---|
| *G06T 15/08* | (2011.01) |
| *G06T 15/00* | (2011.01) |
| *H04N 13/395* | (2018.01) |
| *G06T 19/00* | (2011.01) |

(52) U.S. Cl.
CPC ............ *G06T 15/08* (2013.01); *G06T 15/005* (2013.01); *G06T 19/006* (2013.01); *H04N 13/395* (2018.05); *G06T 2215/06* (2013.01); *G06T 2219/008* (2013.01)

(58) Field of Classification Search
None
See application file for complete search history.

(56) References Cited

U.S. PATENT DOCUMENTS

| | | | | |
|---|---|---|---|---|
| 2005/0140673 | A1* | 6/2005 | Guo | G06T 15/00 345/426 |
| 2007/0229500 | A1* | 10/2007 | Engel | G06T 15/08 345/422 |
| 2009/0102837 | A1* | 4/2009 | Kang | G06T 15/503 345/419 |

(Continued)

OTHER PUBLICATIONS

Chu, Alan, et al. "GI4d: A gpu-based architecture for interactive 4d visualization." IEEE transactions on visualization and computer graphics 15.6 (2009): 1587-1594.*

*Primary Examiner* — Ryan M Gray
(74) *Attorney, Agent, or Firm* — Angela Holt; Frank M. Caprio; Bradley Arant Boult Cummings LLP (57) ABSTRACT

A method for visualizing a three-dimensional volume for use in a virtual reality environment is performed by uploading two-dimensional images for evaluation, creating planar depictions of the two-dimensional images, and using thresholds to determine if voxels should be drawn. A voxel volume is created from the planar depictions and voxels. A user defines a plane to be used for slicing the voxel volume, and sets values of the plane location and plane normal. The slice plane is placed within the voxel volume and defines a desired remaining portion of the volumetric plane to be displayed. All but the desired remaining portion of the voxel volume is discarded and the remaining portion is displayed.

16 Claims, 7 Drawing Sheets

(56) References Cited

U.S. PATENT DOCUMENTS

| | | | |
|---|---|---|---|
| 2010/0194750 A1* | 8/2010 | Mielekamp | G06T 19/00 345/424 |
| 2010/0328305 A1* | 12/2010 | Vining | G09B 23/285 345/419 |
| 2011/0028842 A1* | 2/2011 | Lee | A61B 8/523 600/443 |
| 2011/0074785 A1* | 3/2011 | Moriya | G06T 19/00 345/427 |
| 2013/0050208 A1* | 2/2013 | Lin | G06T 17/20 345/420 |
| 2014/0320494 A1* | 10/2014 | Kawahara | G06T 15/08 345/422 |
| 2018/0344290 A1* | 12/2018 | Veronesi | G06T 7/00 |
| 2019/0133693 A1* | 5/2019 | Mahfouz | G06T 7/579 |
| 2020/0043214 A1* | 2/2020 | Velevski | H04N 1/00244 |
| 2020/0175756 A1* | 6/2020 | Crowe | G06T 17/20 |
| 2020/0219329 A1* | 7/2020 | Crowe | G06T 19/20 |

\* cited by examiner

GEOMETRY BUFFER SLICE TOOL

REFERENCE TO RELATED APPLICATIONS

This application claims priority to Provisional Patent Application U.S. Ser. No. 62/831,309 entitled "Geometry Buffer Slice Tool" and filed on Apr. 9, 2019, which is fully incorporated herein by reference.

BACKGROUND AND SUMMARY

The disclosure relates to an image-generation method for three-dimensional images. In this context, a voxel is to be understood to mean a volume element in the three-dimensional examination zone and a pixel is an image element of the two-dimensional image. A voxel image value is assigned a numerical value that characterizes a physical quantity in the relevant voxel.

Currently, there are a limited number of methods software packages use to see scanned data. Usually these methods use a combination of software packages to evaluate the data set. One current method is to view the scans in software and then exporting to create a three-dimensional image or three-dimensional printed model. Most current methods involve scrolling through the scans one by one or for health professionals to clean the data. These methods are time consuming and expensive, and they create data sets that are static and not manipulatable.

The conventional approach involves the following two different methods: three-dimensional printing and evaluating scan data on a computer. For three-dimensional printing, the user performs various conversions of the scan data, loads scan data into a file that can be printed, imports a three-dimensional mesh file into a three-dimensional modeling software for polishing, exports the polished model to a file, and prints the model.

Users can use scan data on a computer processing unit. In the most common method, a user evaluates scan data on a computer scrolls through the scan images, uses a software package to load the scans and turn them into a three-dimensional mesh, the software renders the mesh onto a two-dimensional screen, and user can rotate the mesh around the z axis. Some users may make a three-dimensional mesh out of the scans; however, these are rudimentary and time-consuming.

What is needed is a method that allows software to use virtual reality tools to view the inside of virtual object clusters.

The method according to the present disclosure improves upon existing methods to build up voxels and to create volumetric three-dimensional data, such as using two-dimensional images loaded into a three-dimensional mesh generating program. The mesh generating program creates a three-dimensional mesh based on two-dimensional images input into the program and the user described predetermined threshold value. Once the mesh is generated, the user can load the mesh into virtual space for evaluation. However, this process can be time consuming and often necessitates repetition before yielding desired results, because it is not done at runtime.

Under the described method, users can create a planer slice tool based on arbitrary sizes. These planer slice tools can be used to see data inside three-dimensional object mesh.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds. As used herein, "voxel" is used to describe a value on a regular grid in three-dimensional space. The position of the voxel is determined by the software by the location of the pixels over a user-determined threshold.

Figure 1:
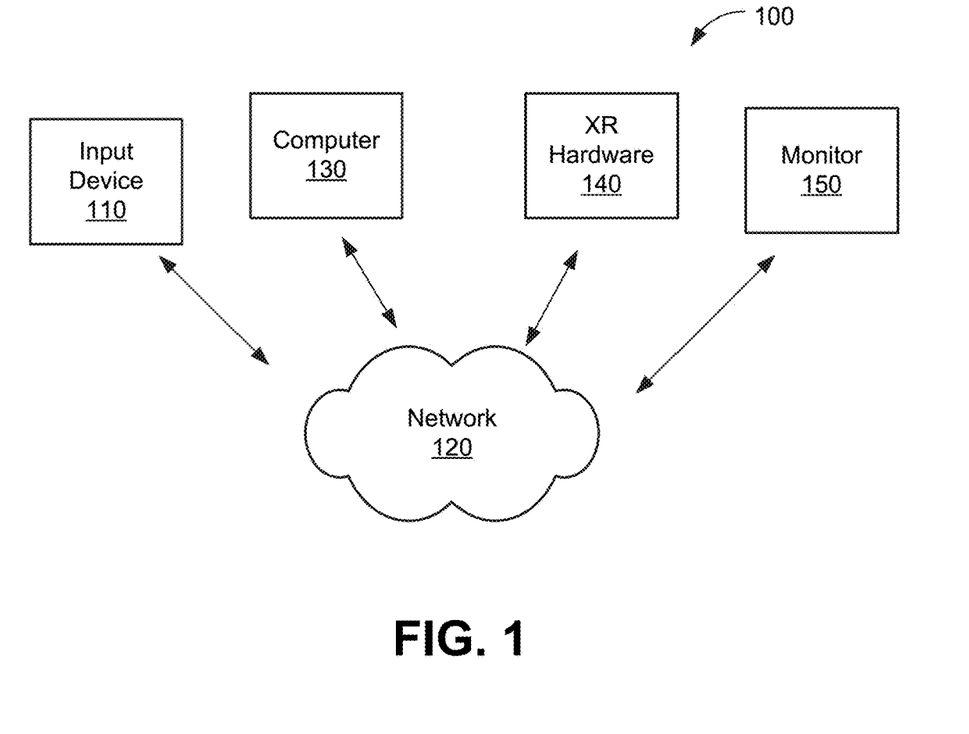
FIG. 1 depicts a system for mapping two-dimensional and three-dimensional images according to an exemplary embodiment of the present disclosure.

FIG. 1 depicts a system 100 for supporting two-dimensional to three-dimensional spacial mapping according to an exemplary embodiment of the present disclosure. The system 100 comprises an input device 110 communicating across a network 120 to a computer 130. The input device 110 may comprise, for example, a keyboard, a switch, a mouse, a joystick, a touch pad and/or other type of interface, which can be used to input data from a user of the system 100. The network 120 may be of any type network or networks known in the art or future-developed, such as the internet backbone, Ethernet, Wifi, WiMax, and the like. The network 120 may be any combination of hardware, software, or both. XR hardware 140 comprises virtual or mixed reality hardware that can be used to visualize a three-dimensional world. A video monitor 150 is used to display a VR space to a user. The input device 110 receives input from the processor 130 and translates that input into an XR event or function call. The input device 110 allows a user to input data to the system 100, by translating user commands into computer commands.

Figure 2:
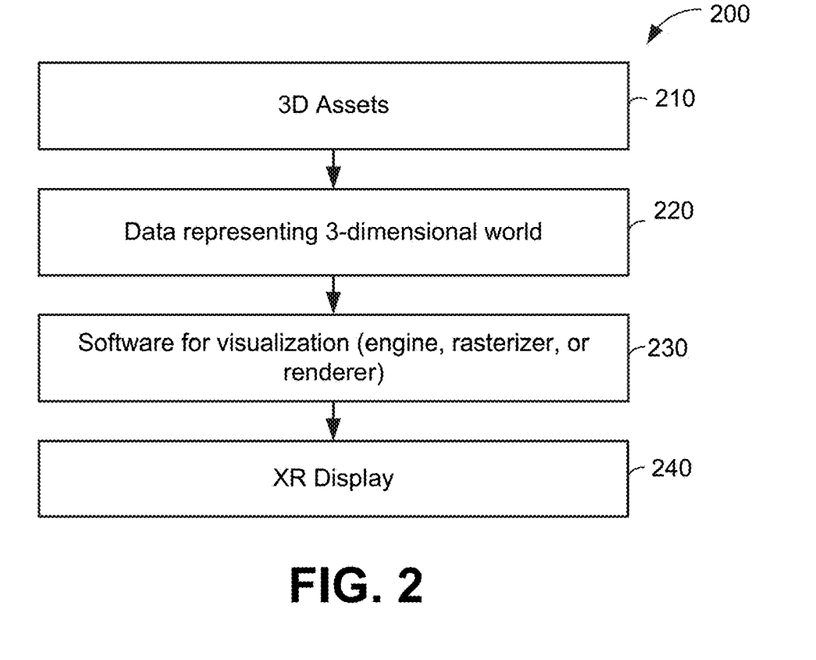
FIG. 2 illustrates the relationship between three-dimensional assets, the data representing those assets, and the communication between that data and the software, which leads to the representation on the XR platform.

FIG. 2 illustrates the relationship between three-dimensional assets 210, the data representing those assets 220, and the communication between that data and the software, which leads to the representation on the XR platform. The three-dimensional assets 210 may be any three-dimensional assets, which are any set of points that define geometry in three-dimensional space.

The data representing a three-dimensional world 220 is a procedural mesh that may be generated by importing three-dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
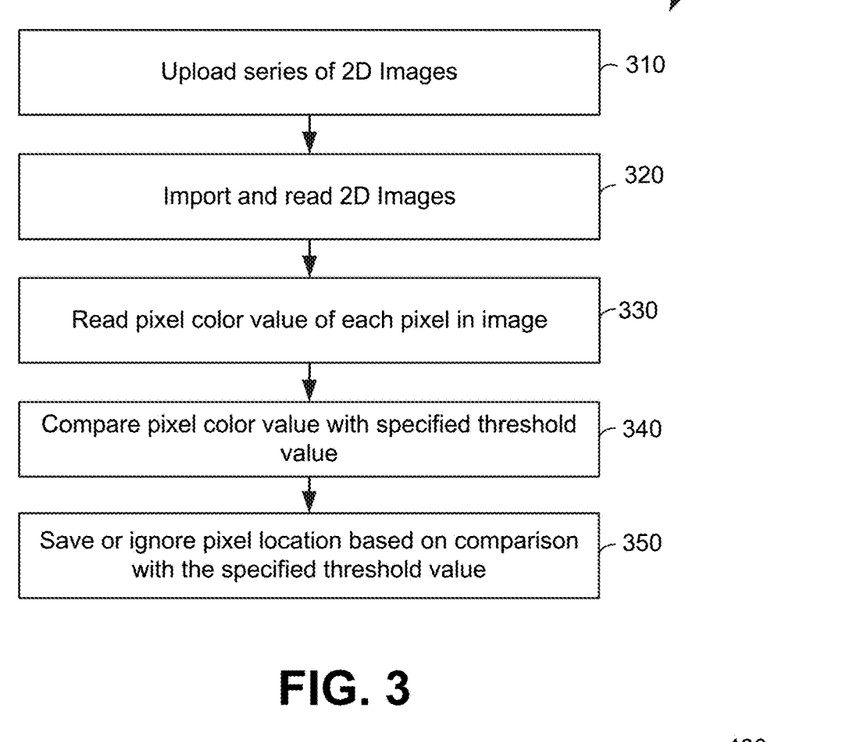
FIG. 3 is a flow diagram depicting the data importation and asset creation process performed by the software.

FIG. 3 depicts a method 300 for importing and analyzing data, in accordance with an exemplary embodiment of the present disclosure. In step 310, the user uploads a series of two-dimensional images. This can be done through a graphical user interface, copying the files into a designated folder, or another upload method. In step 320, the computer imports the two-dimensional images. In step 330, the software loops through the rows and columns of each two-dimensional image and evaluates each pixel and reads the color values of each pixel. In step 340, the software compares each individual pixel color value for the image against a specified threshold value. The threshold value can be user-defined or computer-generated. In step 350, the software saves and tracks the location of pixels with a color value above the specified threshold, or within a range of values. Pixels outside of the desired threshold are ignored, i.e., are not further tracked or displayed. The pixels may be saved in a variety of ways, such as: an array associated with a certain image, a text file, or other save methods. Adjustments can be made in this step to pixel colors or opacity based on user thresholds.

Figure 4:
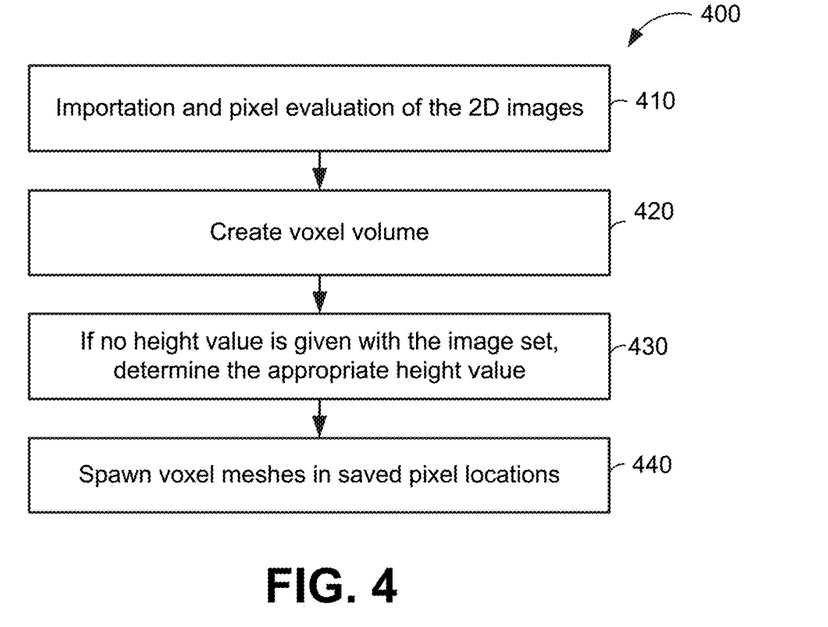
FIG. 4 is a flow diagram depicting the creation of the voxel representation from two-dimensional images.

FIG. 4 depicts a method 400 of creating voxel representations of a series of images, according to an exemplary embodiment of the present disclosure. In step 410, the 2D images are imported as described in FIG. 3, and the image data is evaluated and saved into two-dimensional textures, so that they may be accessed sequentially and height adjusted. In step 420, the software creates the voxel volume by using the pixel at a certain location in one of the tiles for the color and the number of the tile as a reference point for the height of the voxel. For example, if there are 100 images in a deck and each image is spaced 0.5 mm apart, then image 0 is located at a Z-height value of 0 and image 100 is located at a Z value of 247.5, which is 99 images*2.5 mm.

In step 430, the voxel locations are added to an array of instances. The array can then be used as the basis for locations of each of the meshes that will represent the voxel volume. Each voxel is drawn at corresponding locations in the array. If no height value is given with the image set, the system determines the appropriate height value. In step 440, voxel volumes are spawned at the saved pixel locations.

Figure 5:
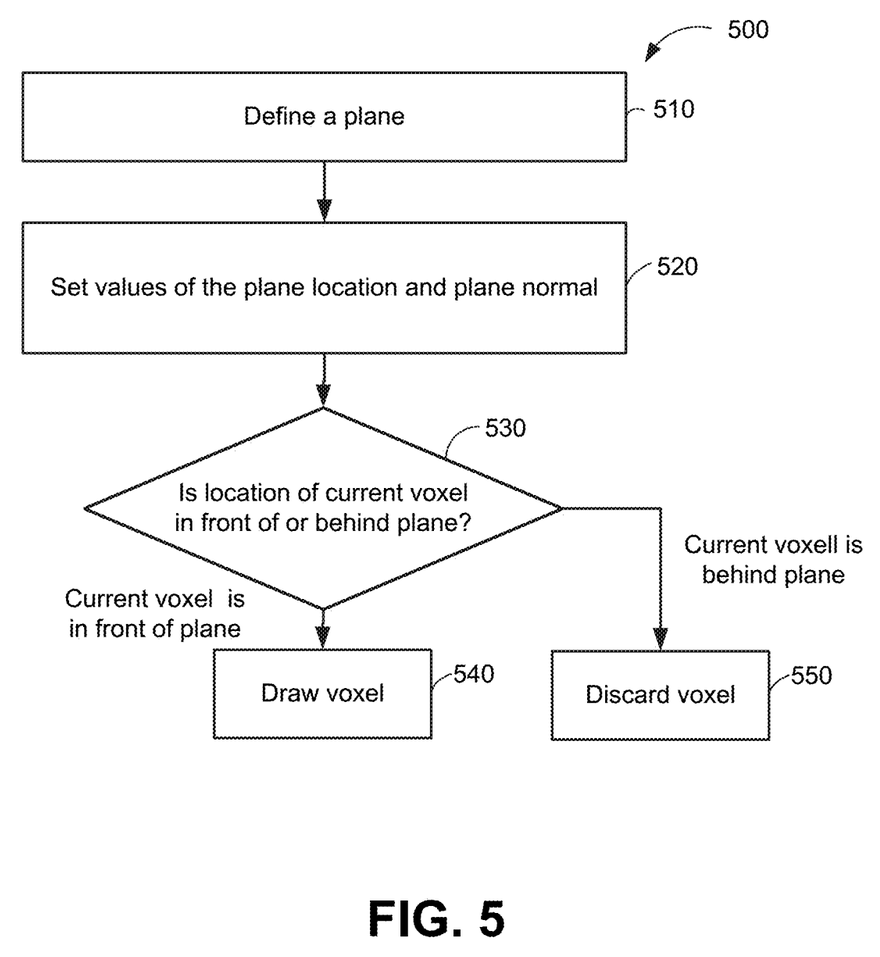
FIG. 5 depicts a method of displaying a slice of a voxel model according to an exemplary embodiment of the present disclosure.

FIG. 5 depicts a method 500 of displaying a slice of a virtual volume, according to an exemplary embodiment of the present disclosure. In step 510, a plane to be sliced is defined. In this regard, a planar object is used to check against for slicing operations. The planar object could be an object in the world that is shaped like a plane, or it could be some other arbitrary set of points that define a plane. A user uses a tool in VR space to identify the desired location to be sliced, and the user-identified location is translated by the system into a plane.

In step 520, when the plane is in contact with the rendered volume, the system updates the values for the plane's location and the plane normal. In step 530, the system determines whether the location of the currently evaluated voxel is in front of or behind the plane. In this regard, the system software checks the location of the plane and the plane normal against the current voxel's location by using the dot-product of the vector from the plane to the voxel against the normal of the plane in the object's local space.

In step 540, if the location of the plane is greater than or equal to zero, then the voxel is in front of the plane and is drawn. In step 550, if the location in 530 is less than zero, then the voxel is not in front of the plane and is not drawn, i.e., the voxel is discarded, and the next voxel location is checked.

Figure 6:
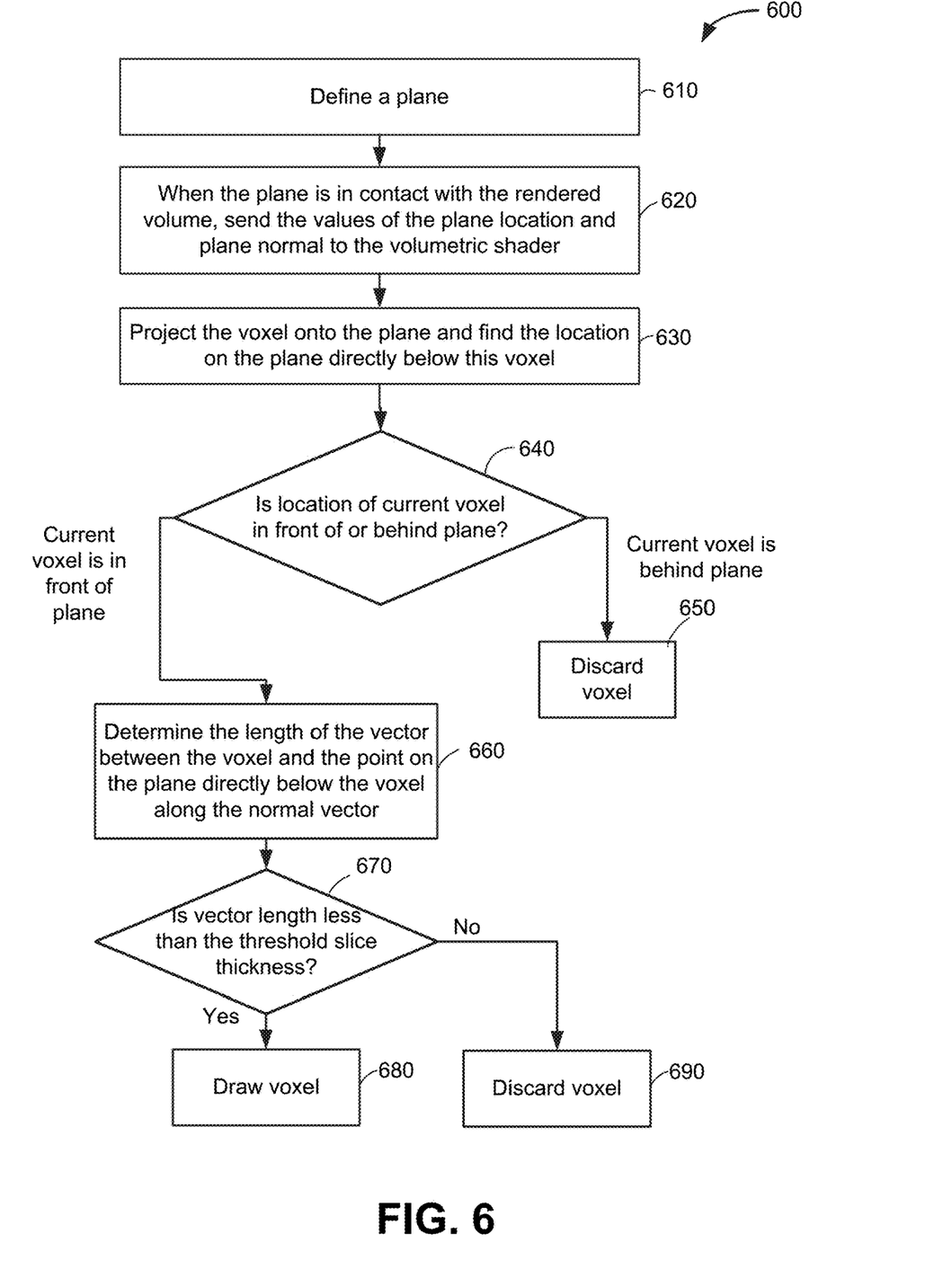
FIG. 6 depicts a method for creating a slice with a user-determined thickness.

FIG. 6 depicts a method 600 according to another embodiment of the present disclosure, for creating a slice with a user-determined thickness. In step 610, the user defines the plane to be sliced in the same manner as step 510 of FIG. 5. In step 620, when the plane is in contact with the rendered volume, the software updates the values for the plane's location and the plane normal. In this regard, the software creates a vector from a known point on the plane to the voxel, and then takes the dot product of the vector over the normal and multiplies the original plane normal by the dot product. In step 630, the system determines how far away from the plane the voxel is compared to the normal of the plane by subtracting the result of the normal multiplied from the dot product from the original voxel point. The result is a point on the plane directly below the voxel.

In step 640, the software determines the voxel location relative to the plane point by determining whether the location of the current voxel is in front of or behind the plane. In step 650, if the current voxel is behind the plane, then the voxel is discarded.

In steps 660 and 670, if the voxel is in front of the plane and the distance from the plane point to the voxel is less than or equal to the user-desired slice thickness, then the software determines the magnitude of the vector from the projected plane point to the voxel location. In step 680, the voxel is drawn. If the distance from the plane point to the voxel is greater than the desired threshold slice thickness, the voxel is discarded, in step 690.

Figure 7:
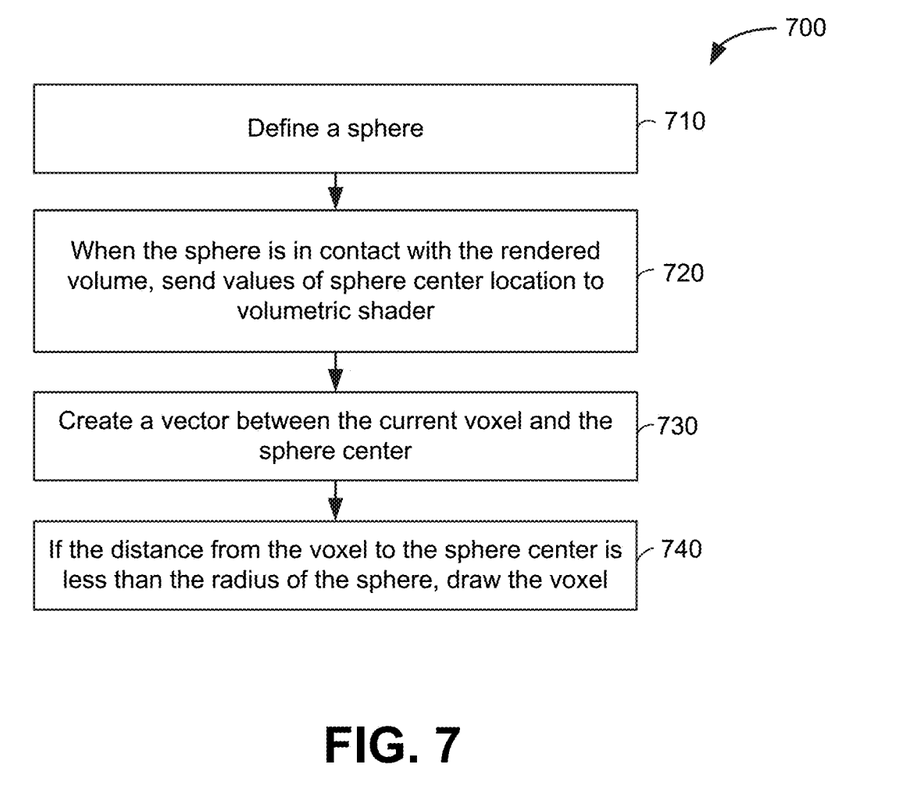
FIG. 7 depicts a method for creating a spherical slice, according to an embodiment of the present disclosure.

FIG. 7 depicts a method 700 for creating a spherical slice, according to an embodiment of the present disclosure. In step 710, the user defines a sphere. In step 720, when the sphere is in contact with the rendered volume, the software sends the values of the sphere center location into the geometry shader. In step 730, the software creates a vector between the voxel and the sphere center. In step 740, if the distance from the voxel to the sphere center is less than the radius of the sphere, that voxel is drawn. After the voxels are determined to be drawn or not drawn, the image will show the remaining volume with respect to the selected area.

Figure 8:
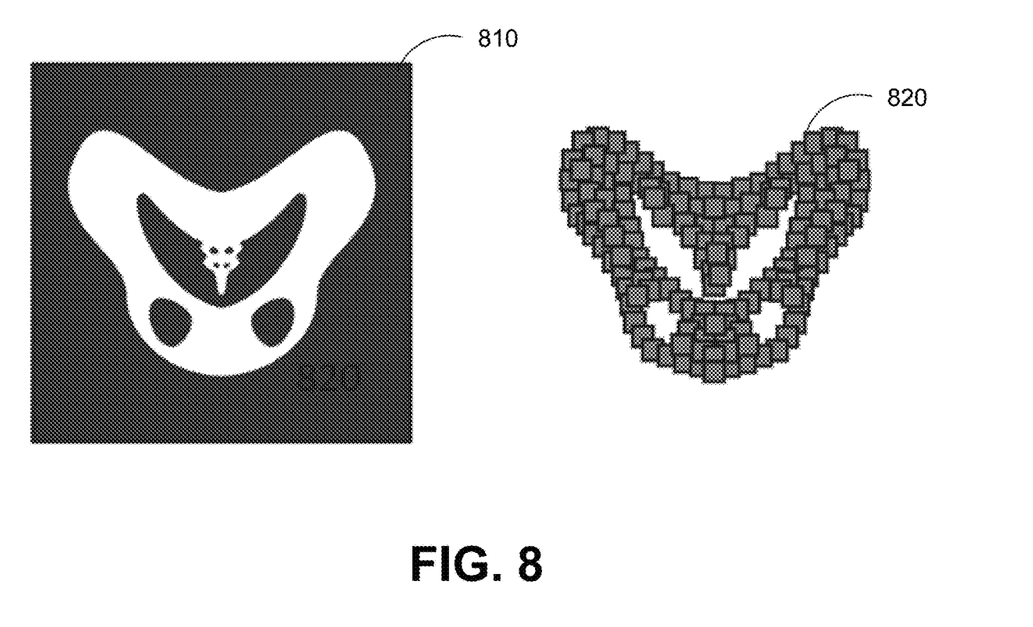
FIG. 8 is a pictorial depiction of a two-dimensional image and a voxel volume.
Figure 9:
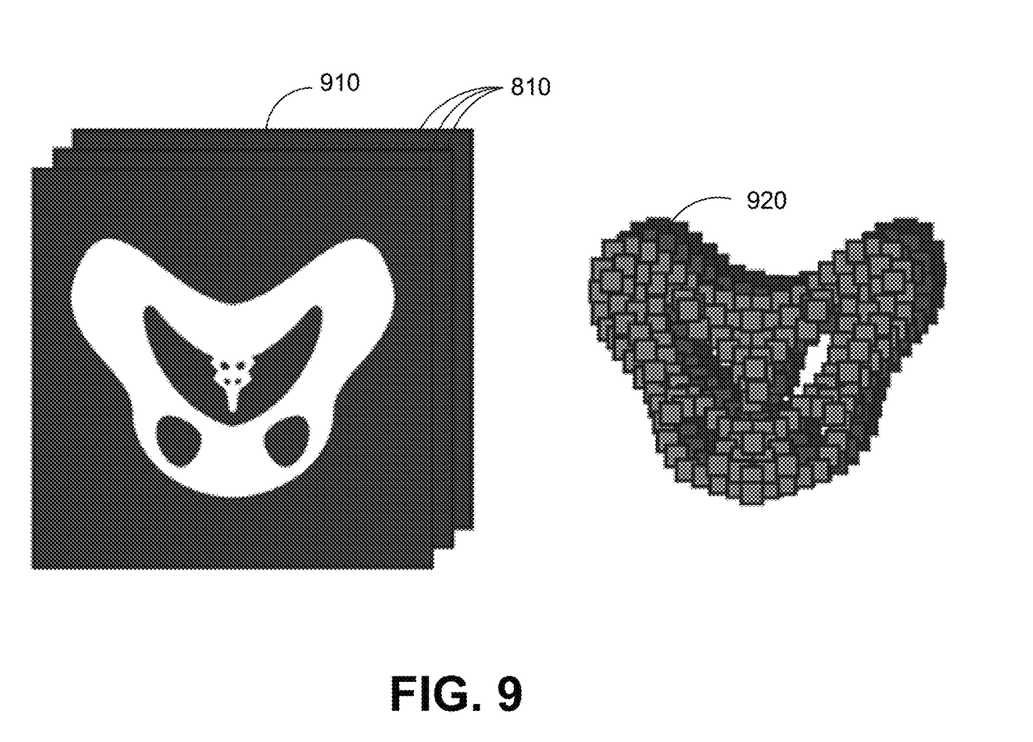
FIG. 9 depicts a two-dimensional deck of images and a three-dimensional representation of the two-dimensional deck.

FIG. 8 is a pictorial depiction of a two-dimensional image 810 and a voxel volume 820. In this example, the image and volume depict a human pelvis. FIG. 9 depicts a two-dimensional deck 910 of images 810 and a three-dimensional representation (a voxel model) 920 of the two-dimensional deck 910.

Figure 10:
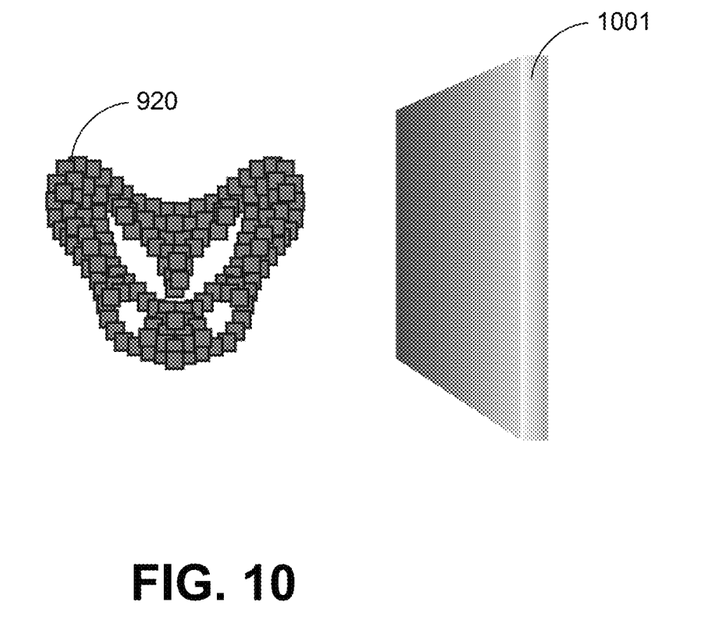
FIG. 10 depicts a voxel model shown in front of a plane.
Figure 11:
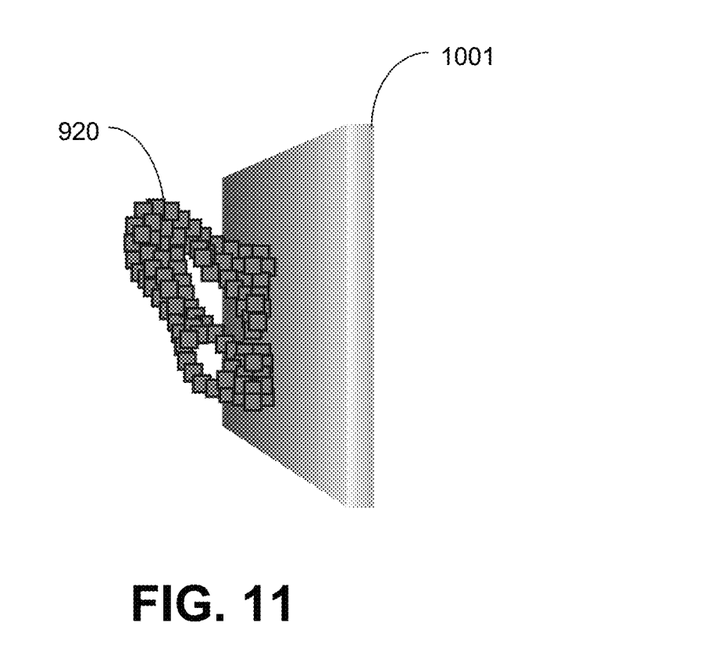
FIG. 11 depicts the voxel model of FIG. 10 having been sliced by the plane.

FIG. 10 depicts a voxel model 920 shown in front of a plane 1001. FIG. 11 depicts the voxel model 920 of FIG. 10 having been sliced by the plane 1001 using the methods disclosed herein, such that voxels behind the plane have been culled out.

What is claimed is:
1. A method of visualizing a three-dimensional volume for use in a virtual reality environment, comprising:
uploading two-dimensional images for evaluation;
creating planar depictions of the two-dimensional images;

using thresholds to determine if voxels should be drawn;
creating a voxel volume from the planar depictions and voxels;
defining a slice plane to be used for slicing the voxel volume;
setting values of the slice plane location and plane normal;
selecting a size of the slice plane to be placed;
placing the slice plane within the voxel volume to define a desired remaining portion of the voxel volume;
discarding all of the voxel volume except for the remaining portion; and
displaying the remaining portion.

2. The method of claim 1, wherein the steps of discarding all of the voxel volume except for the remaining portion and displaying the remaining portion comprise determining whether the location of a current voxel is in front of or behind the slice plane, and if the current voxel is in front of the slice plane, drawing the voxel, and if the current voxel is behind the slice plane, discarding the voxel.

3. The method of claim 2, wherein the step of determining if the location of the current voxel is in front of or behind the slice plane comprises using the dot-product of a vector from the slice plane to the current voxel against the normal of the slice plane.

4. The method of claim 3, wherein if the dot-product of the vector is less than zero, then the voxel is not in front of the slice plane, and the voxel is discarded.

5. The method of claim 4, wherein if the dot-product of the vector is greater than zero, then the voxel is in front of the slice plane, and the voxel is drawn.

6. The method of claim 1, further comprising creating a slice with a user-determined thickness.

7. The method of claim 6, wherein the step of creating a slice with a user-determined thickness comprises using vectors to determine how far away from the slice plane the voxel is compared to the normal of the slice plane.

8. The method of claim 7, wherein the step of using vectors to determine how far away from the slice plane the voxel is compared to the normal of the plane comprises projecting the voxel onto the slice plane to find the location on the slice plane directly below the voxel, and if the voxel is in front of the slice plane and the distance from the slice plane to the voxel is less than or equal to a user-desired slice thickness, draw the voxel.

9. A method of visualizing a three-dimensional volume for use in a virtual reality environment, comprising:
uploading two-dimensional images for evaluation;
creating planar depictions of the two-dimensional images;
using thresholds to determine if voxels should be drawn;
creating a voxel volume from the planar depictions and voxels;
defining a slice plane to be used for slicing the voxel volume;
setting values of the slice plane location and plane normal;
selecting a size of the slice plane to be placed;
determining whether the location of a current voxel is in front of or behind the slice plane, and if the current voxel is in front of the slice plane, drawing the voxel, and if the current voxel is behind the slice plane, discarding the voxel.

10. The method of claim 9, wherein the step of determining if the location of the current voxel is in front of or behind the slice plane comprises using the dot-product of a vector from the slice plane to the current voxel against the normal of the slice plane.

11. The method of claim 10, wherein if the dot-product of the vector is less than zero, then the voxel is not in front of the slice plane, and the voxel is discarded.

12. The method of claim 11, wherein if the dot-product of the vector is greater than zero, then the voxel is in front of the slice plane, and the voxel is drawn.

13. The method of claim 9, further comprising creating a slice with a user-determined thickness.

14. The method of claim 13, wherein the step of creating a slice with a user-determined thickness comprises using vectors to determine how far away from the slice plane the voxel is compared to the normal of the slice plane.

15. The method of claim 14, wherein the step of using vectors to determine how far away from the slice plane the voxel is compared to the normal of the plane comprises projecting the voxel onto the slice plane to find the location on the slice plane directly below the voxel, and if the voxel is in front of the slice plane and the distance from the slice plane to the voxel is less than or equal to a user-desired slice thickness, draw the voxel.

16. A method of visualizing a three-dimensional volume for use in a virtual reality environment, comprising:
uploading two-dimensional images for evaluation;
creating planar depictions of the two-dimensional images;
creating a voxel volume based on the two-dimensional images;
defining a sphere to be used for slicing the voxel volume;
when the sphere is in contact with the voxel volume, send values of the sphere center location to a geometry shader;
create a vector between a current voxel and the sphere center;
if the distance from the current voxel in the voxel volume to the sphere center is less than the radius of the sphere, draw the voxel, and if the distance from the current voxel to the sphere center is greater than or equal to the radius of the sphere, discard the voxel.

* * * * *